United States Patent
Rose

(10) Patent No.: US 6,643,909 B2
(45) Date of Patent: Nov. 11, 2003

(54) METHOD OF MAKING A PROXIMITY PROBE

(75) Inventor: Robert Ivan Rose, Gardnerville, NV (US)

(73) Assignee: Bently Nevada LLC, Minden, NV (US)

(*) Notice: Subject to any disclaimer, the term of this patent is extended or adjusted under 35 U.S.C. 154(b) by 0 days.

(21) Appl. No.: 09/833,244

(22) Filed: Apr. 10, 2001

(65) Prior Publication Data
US 2002/0145421 A1 Oct. 10, 2002

(51) Int. Cl.⁷ ................................................ G01R 3/00
(52) U.S. Cl. ......................... 29/595; 29/594; 29/606; 29/828; 29/855; 29/856; 324/207.16; 324/207.26; 324/236; 324/237; 264/272.13; 264/272.15; 264/272.16; 264/272.19; 264/328.12; 425/125; 425/145; 425/146; 425/147
(58) Field of Search .......................... 29/594, 595, 606, 29/828, 855, 856; 524/207.16, 207.26, 236, 237, 173, 174; 264/272.13, 272.15, 272.16, 272.19, 328.12; 425/125, 145, 146, 147, 577

(56) References Cited

U.S. PATENT DOCUMENTS

| | | |
|---|---|---|
| 2,361,348 A | 10/1944 | Dickson et al. |
| 2,890,505 A | 6/1959 | Brand |
| 3,473,110 A | 10/1969 | Hardin et al. |
| 3,932,828 A | 1/1976 | Plunkett et al. |
| 3,996,510 A | 12/1976 | Guichard |
| 4,000,877 A | 1/1977 | Shead et al. |
| 4,162,138 A | 7/1979 | Byrne |
| 4,377,548 A | 3/1983 | Pierpont |
| 4,408,159 A | 10/1983 | Prox |
| 4,419,646 A | 12/1983 | Hermle |
| 4,470,786 A | 9/1984 | Sano et al. |
| 4,564,810 A | 1/1986 | Geithman et al. |
| 4,680,543 A | 7/1987 | Kohen |
| 4,829,245 A | 5/1989 | Echasseriau et al. |
| 4,847,557 A | 7/1989 | Saito et al. |
| 4,849,728 A | 7/1989 | Goll et al. |
| 4,954,307 A | 9/1990 | Yokoyama |
| 4,959,000 A | 9/1990 | Giza |
| 5,016,343 A | 5/1991 | Schutts |

(List continued on next page.)

FOREIGN PATENT DOCUMENTS

| | | |
|---|---|---|
| EP | 571 129 A1 | 11/1993 |
| EP | 642 026 A1 | 3/1995 |
| FR | 2 576 245 | 7/1986 |
| GB | 1313748 | 4/1973 |
| GB | 1 353 603 | 5/1974 |
| JP | 53064-279 | 6/1978 |
| JP | 62-162514 | 7/1987 |
| JP | 6-37130 | 7/1992 |
| WO | WO 84/03794 | 9/1984 |

*Primary Examiner*—Peter Vo
*Assistant Examiner*—Paul D Kim
(74) *Attorney, Agent, or Firm*—Dennis A. DeBoo

(57) ABSTRACT

Method of making a proximity probe including providing a preform having an interior cavity accessible by an opened rearward end; coupling a coil to the preform proximate a forward most end of the preform for defining an assembly; locating a single support pin through the rearward end such that the support pin extends within the interior cavity while having an end emanating from the rearward end; cantilevering the emanating end between an upper and a lower mold plate defining a mold cavity for supporting the assembly; injecting moldable material into the mold cavity for molding an encapsulation of material over the assembly for defining an encapsulated probe tip, allowing the encapsulated probe tip to cure; removing the encapsulated probe tip from the mold cavity; removing the support pin from the assembly, and coupling a cable to the encapsulated probe tip for forming the proximity probe.

19 Claims, 9 Drawing Sheets

U.S. PATENT DOCUMENTS

| | | |
|---|---|---|
| 5,018,049 A | 5/1991 | Mehnert |
| 5,021,737 A | 6/1991 | Schutts |
| 5,036,285 A | 7/1991 | Shaw |
| 5,039,942 A | 8/1991 | Buchschmid et al. |
| 5,049,055 A | 9/1991 | Yokoyama |
| 5,122,046 A | 6/1992 | Lavallee et al. |
| 5,133,921 A | 7/1992 | Yokoyama |
| 5,138,292 A | 8/1992 | Forster |
| 5,147,657 A | 9/1992 | Giza |
| 5,151,277 A | 9/1992 | Bernardon et al. |
| 5,182,032 A | 1/1993 | Dickie et al. |
| 5,226,221 A | 7/1993 | Kilgore |
| 5,240,397 A | 8/1993 | Fay et al. |
| 5,252,051 A | 10/1993 | Miyamoto et al. |
| 5,278,496 A | 1/1994 | Dickmeyer et al. |
| 5,351,388 A | 10/1994 | Van Den Berg et al. |
| 5,376,325 A | 12/1994 | Ormson |
| 5,381,089 A | 1/1995 | Dickmeyer et al. |
| 5,388,916 A | 2/1995 | Ohtsuki et al. |
| 5,418,454 A | 5/1995 | Togo |
| 5,507,089 A | 4/1996 | Dickmeyer |
| 5,563,510 A * | 10/1996 | Gorrell et al. ............... 324/174 |
| 5,633,062 A | 5/1997 | Saito et al. |
| 5,685,884 A | 11/1997 | Van Den Berg |
| 5,691,636 A * | 11/1997 | Allshouse et al. ...... 324/207.15 |
| 5,712,562 A | 1/1998 | Van Den Berg |
| 5,770,941 A | 6/1998 | Van Den Berg |
| 5,818,224 A | 10/1998 | Van Den Berg |
| 5,998,988 A * | 12/1999 | Dickmeyer et al. ......... 324/174 |
| 6,025,719 A | 2/2000 | Anderson |
| 6,072,312 A | 6/2000 | Van Den Berg |
| 6,131,267 A | 10/2000 | Van Den Berg |
| 6,131,270 A | 10/2000 | Van Den Berg |
| 6,170,148 B1 | 1/2001 | Van Den Berg |
| 6,250,519 B1 * | 6/2001 | Bruening .................... 222/573 |

\* cited by examiner

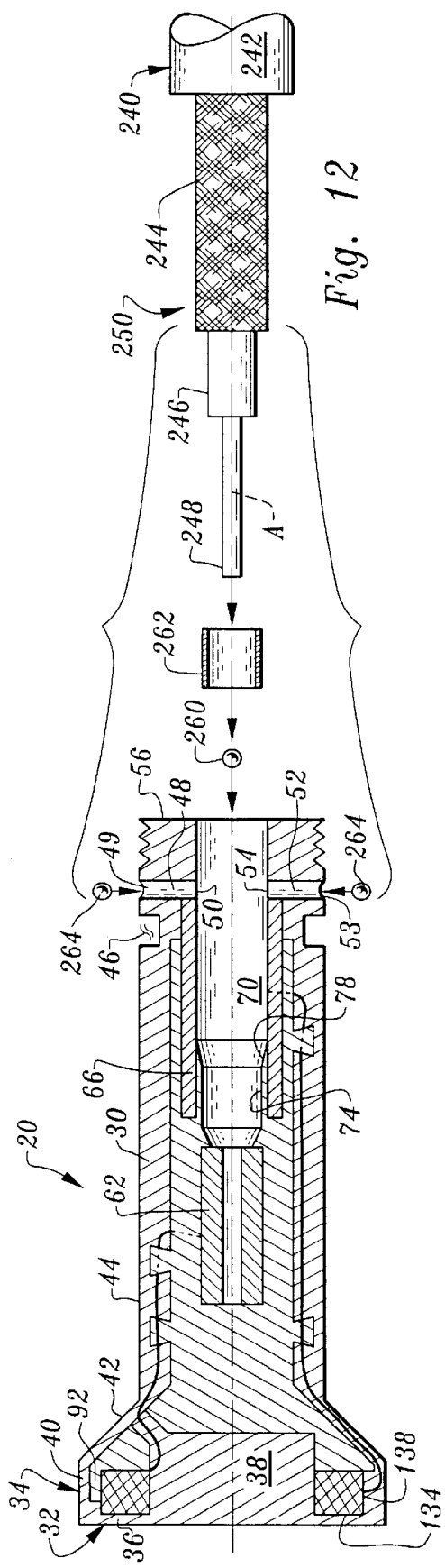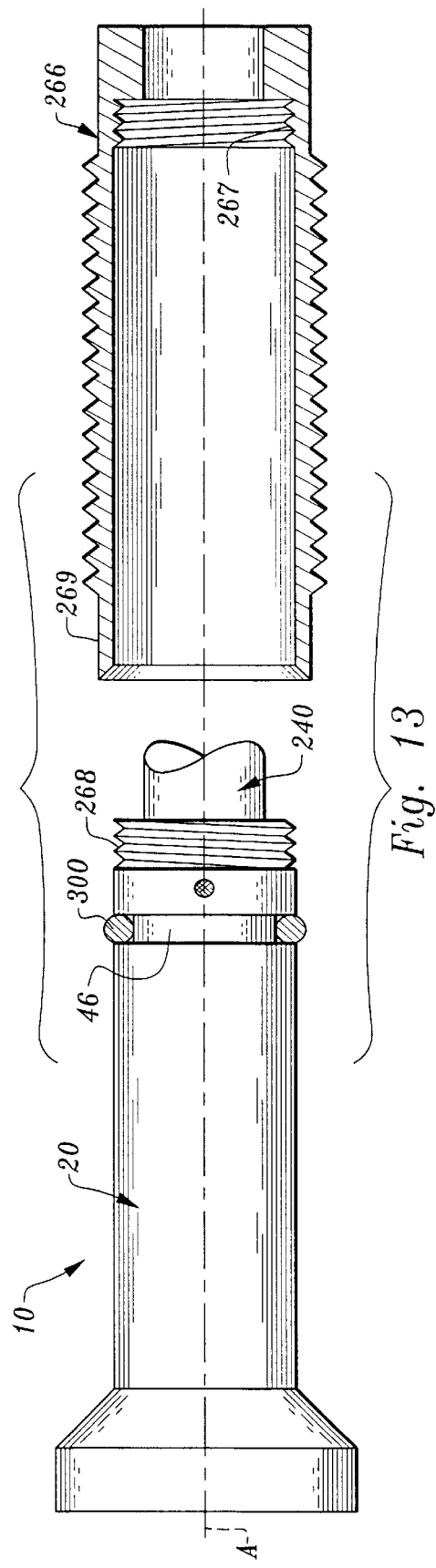

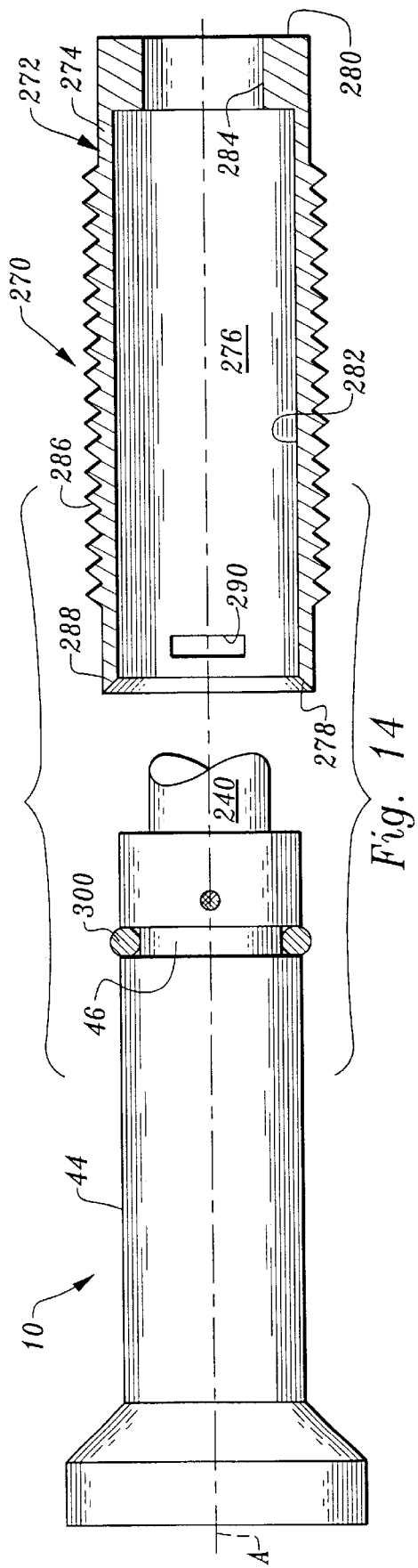
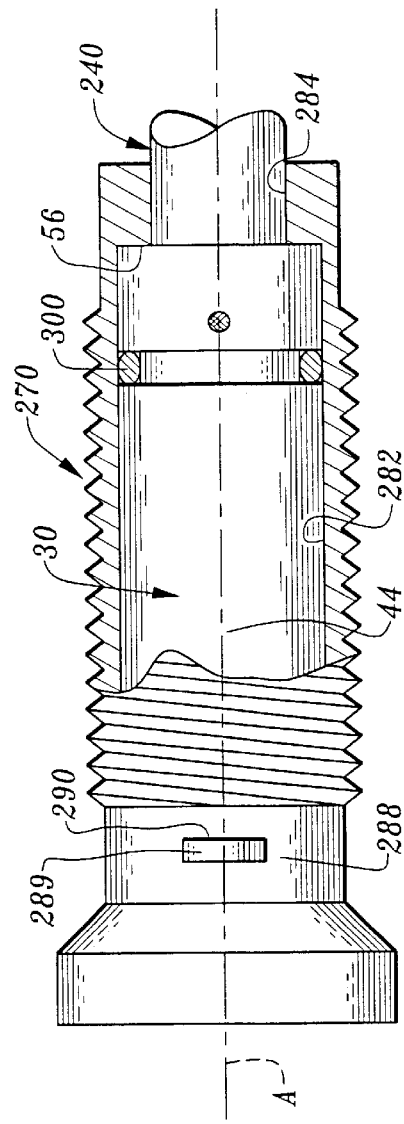
Fig. 14
Fig. 15

METHOD OF MAKING A PROXIMITY PROBE

FIELD OF THE INVENTION

The present invention relates generally to a proximity probe and, in particular, to an encapsulated proximity probe and its manufacturing method for providing an accurate encapsulated proximity probe that is impervious to the predations of its environment and that is used to, inter alia, monitor vibration of rotating and reciprocating machinery.

BACKGROUND OF THE INVENTION

Proximity probe systems that analyze and monitor, for example, rotating and reciprocating machinery are known in the art. These systems typically include one or more proximity probes: noncontacting devices that measure displacement motion and position of the observed conductive target material relative to the probe. Typically, each proximity probe is located proximate a target object such as a rotating shaft of a machine or an outer race of a rolling element bearing being monitored and is connected to conditioning circuitry which in turn is coupled to analyzing apparatus for data reduction and display. By known techniques, these systems analyze and monitor rotating and reciprocating machinery for providing, inter alia, indications of incipient problems. A variety of proximity probe systems with a variety of different proximity probes are at the present time being sold by the assignee of this application, Bently Nevada Corporation of Minden, Nev.

In general, proximity probes are required to operate with precision under very adverse physical, chemical, and mechanical conditions and are often difficult to replace. Thus, there is an ongoing effort to make the proximity probe one of the most accurate and reliable parts of any proximity probe system.

The assignee's untiring commitment to improving proximity probes and the methods of manufacturing such probes for making the proximity probe one of the most accurate and reliable parts of any proximity probe system is chronicled in the seven patents to Van Den Berg (U.S. Pat. Nos.: 6,131,270; 6,131,267; 6,072,312; 5,818,224; 5,770,941; 5,712,562; and 5,685,884), the two patents to Schutts (U.S. Pat. Nos.: 5,021,737 and 5,016,343), and the single patent to Van Den Berg, et al. (U.S. Pat. No. : 5,351,388) all of which are hereby incorporated by reference in their entireties. However, it is stipulated that none of these references teach singly nor render obvious when considered in any conceivable combination the nexus of the present invention as disclosed in greater detail hereinafter and as particularly claimed.

Hence, the assignee's patents as identified hereinabove reflect a line of proximity probes and the methods of manufacturing such probes. In their essence, these patents delineate a variety of different proximity probe tips, a variety of different bobbin or preform configurations, and how proximity probe manufacturing has evolved from the process of simply placing and epoxying a plastic insulating cap over a combined sensing coil, bobbin (or preform) and a fixed cable length assembly to an injection molding process of the coil, bobbin (or preform) and the fixed cable length assembly using radial and axial pin pulling techniques.

Heretofore, both the epoxying process and the injection molding process used to cover the sensing coil have been known to leave seams or interruptions that are susceptible to, inter alia, predations of the environment such as fluid and/or vapor ingress (e.g., oil, oil vapor, water, and/or water vapor) into the interior of the probe thereby causing probe deterioration leading to, inter alia, inaccurate and unreliable probe measurements.

For example, the pins employed in the radial and axial pin pulling process have been known to cause areas that fail to be filled in with moldable material during the encapsulation process such that an opening, slit, or the like is formed that allows fluid and/or vapor ingress into the interior of the probe thereby causing probe deterioration leading to, inter alia, inaccurate and unreliable probe measurements.

Furthermore, the radial and axial pin pulling processes are problematic in that the sensing coil, preform and fixed cable length assembly may become misaligned within the encapsulation thereby altering the desired spacing between a target object and the sensing coil of the probe such that inaccurate and unreliable measurements are obtained when in operation.

Specifically, it is critical that the displacement motion or position between the target object and the sensing coil of the proximity probe remains within the linear range of the proximity probe for providing accurate and reliable measurements over a wide range of circuit and environmental conditions in order to operate rotating and reciprocating machinery safely and efficiently. Thus, if the coil becomes skewed within the encapsulation the displacement motion or position between the target object and one area of the skewed coil will be different than the displacement motion or position between the target object and another area of the skewed coil thereby providing erroneous and undependable probe measurements when in operation. In fact, if the coil becomes skewed within the encapsulation the displacement motion or position between the target object and the sensing coil may completely fall out of the linear range of the proximity probe resulting in flawed probe measurements when in operation.

Moreover, a typical pin pulling process requires locating and aligning each of the coil and cable assemblies within a lower mold cavity via radial and axial pins, lowering or closing an upper mold cavity, injecting moldable material within the mold cavities, retracting the pins and further injecting moldable material within the mold cavities heretofore occupied by the retractable pins for fully encapsulating the coil and fixed cable length assembly. Hence, the pin pulling process requires that the molds be outfitted with precision retractable pins that are required to keep the coil and fixed cable length assembly located and aligned within the mold cavity during a first injection process. Then, the pins are timely retracted with precision such that the coil and cable assembly remains properly located and aligned within the mold cavity during a second injection molding process that fills the areas previously occupied by the retractable pins. Thus, this process not only requires a precision mold but also requires retractable pins to be movably disposed within the mold with precision. Additionally, this process requires pin actuators for moving the pins into and out of the mold cavity and supporting electronics that may require programming for orchestrating the timing of pin insertion and retraction. As a result, the pin pulling process relies on a multiplicity of components operating with precision and in synchrony for carrying out the two-step encapsulation process delineated in the prior art noted hereinabove.

For the foregoing reasons, there is a need for a proximity probe that is impervious to the predations of the environment and a method of manufacturing such a probe whereby the manufacturing problems and complexities of the prior art manufacturing processes are substantially eliminated.

Specifically, there is a need for a method of manufacturing proximity probes that can be repeatedly used to encapsulate sensing coils in a symmetrically manner (i.e., without the coils being skewed within the encapsulation). Additionally, there is a need for a method of manufacturing proximity probes that eliminates interruptions, openings, slits or the like that are formed within the encapsulation by internal parts such as sleeves covering the sensing element and/or by the encapsulation (injection molding) process itself. Furthermore, there is a need for a method of manufacturing proximity probes that eliminates the retractable pins, the pin actuators, and the supporting electronics associated with the prior art processes thereby eliminating the expense, unreliability and time consumption associated with these processes.

SUMMARY OF THE INVENTION

The present invention is distinguishable over the known prior art in a multiplicity of ways. For one thing, the present invention provides a method of manufacturing a proximity probe that can be repeatedly used to encapsulate a sensing coil in a symmetrical manner (i.e., without the coil being skewed within the encapsulation) and that eliminates interruptions, openings, slits or the like that are formed within the encapsulation by internal parts such as a sleeve covering the sensing coil and/or by the encapsulation (injection molding) process itself. Additionally, the present invention provides a method of manufacturing a proximity probe that eliminates the prior art pin pulling and two step encapsulation processes thereby eliminating the expense, unreliability and time consumption associated with these processes. Particularly, and in stark contrast to the known prior art, the present invention provides a single step encapsulation process and means for retaining the radial and axial orientation of the sensing coil within the mold cavity while eliminating the manufacturing problems and complexities of the known prior art processes thereby providing a simple, quick, and unfailingly repeatable method of manufacturing a proximity probe.

In its simplest form, and in accordance with the present invention, the proximity probe manufacturing method comprises the steps of: providing a preform supporting a coil at a forward end and including an open ended interior cavity at a rearward end; inserting a support pin into the interior cavity such that an end of the support pin emanates from the rearward end of the preform; using the end of the support pin emanating from the rearward end of the preform for supporting the coil and preform on the support pin and within a mold cavity, and injecting moldable material into the mold cavity during a single injecting step for molding an encapsulation of material ensconcing the coil and preform thereby generally defining an encapsulated probe tip of a proximity probe that is subsequently formed by coupling a cable to the encapsulated probe tip.

More particularly, and in accordance with one preferred form of the present invention, the proximity probe manufacturing method includes providing a preform having an interior cavity accessible by an opened rearward end. A coil is coupled to the preform proximate a forward most end of the preform for defining a coil and preform assembly. A support pin is then axially located through the opened rearward end of the preform and into its interior cavity such that an end of the support pin emanates from the opened rearward end of the preform. The end of the support pin is then cantilevered between an upper and a lower mold plate for supporting the coil and preform assembly on the support pin and within a mold cavity defined by the upper and lower mold plates. Next, moldable material is injected into the mold cavity for molding an encapsulation of material over the coil and preform assembly wherein the encapsulated coil and preform assembly generally defines an encapsulated probe tip which when coupled to a cable generally defines a proximity probe. Hence, one hallmark of the present invention is supporting, within a mold cavity, the coil and preform assembly from the interior of the preform thereby eliminating any obstructions from interfering with the encapsulation of the coil and preform assembly formed by the injection molding process for providing a superior encapsulated proximity probe.

Also in accordance with the present invention, and in one preferred form, the proximity probe is comprised of a preform comprised of an elongated body having a forward most end and a rearward most end. The forward most end of the preform includes a hollow annular recess integrally formed with the preform and transitioning into a centering bore extending into the elongated body of the preform for receiving a mounting pin on which the sensing coil is mounted such that the receipt of the mounting pin with the centering bore centers the coil along a longitudinal axis of the preform and such that the sensing coil is received in the annular recess and affixed thereto by an adhesive interposed between the sensing coil and the annular recess thereby defining a coil and preform assembly. This coil and preform assembly configuration allows tuning of the coil by removing turns of wire from its center. The proximity probe further includes an encapsulation of moldable material ensconcing the coil and preform assembly wherein the encapsulated coil and preform assembly generally defines an encapsulated probe tip connectable to any cable length for generally defining a proximity probe.

Furthermore, through bores may be integrally molded within the encapsulation during the injection molding process and can be employed in coupling a cable of any length to the encapsulated probe tip. In one particular form, the through bores are molded in open communication with a rearward interior cavity of the preform, the cavity having an opened end. A stripped end of a cable is inserted into the rearward interior cavity via the opened end such that an exposed portion of a braided conductor at the stripped end of the cable is in open communication with the through bores. Solder is then inserted into the through bores, melted, and allowed to flow along the braided conductor and into contact with an interior of a ferrule molded in the preform and circumscribing the braided conductor for providing an electrical and mechanical coupling of the cable to the encapsulated probe tip.

Moreover, and in accordance with one preferred form of the present invention, a proximity probe metal casing and interlocking method is provided wherein the metal casing is comprised of an elongated cylindrical structure having a sidewall defining a bore transitioning from a leading end to a trailing end of the structure, the sidewall including at least one geometrically shaped opening disposed through the sidewall and terminating in the bore. The interlocking method is comprised of sliding the metal casing over the cable and onto the encapsulated probe tip and then linearly positioning the metal casing to any discrete location on the encapsulated probe tip. Next, the interlocking method includes applying heat to the metal casing for melting a portion of the underlying encapsulation and allowing the melted portion of the encapsulation to dispense into the geometrical opening disposed within the metal casing thereby interlocking the metal casing to the encapsulation at the linearly positioned location and providing a means for providing case trim adjustment.

OBJECTS OF THE INVENTION

Accordingly, a primary object of the present invention is to provide a new, novel and useful proximity probe and a proximity probe manufacturing method.

A further object of the present invention is to provide a proximity probe as characterized above which includes an encapsulated proximity probe tip manufactured by an injection molding process encapsulating a sensing coil and preform assembly in moldable material and in the absence of a cable connection.

Another further object of the present invention is to provide an encapsulated proximity probe tip as characterized above that is coupled to any length of cable after the injection molding process of encapsulating the sensing coil and preform assembly in moldable material.

Another further object of the present invention is to provide the proximity probe manufacturing method which includes eliminating both axially retractable and radially retractable support pins that respectively provide localized support at the front and sides of a coil and preform assembly and replacing all of these retractable support pins with a single support pin received within an opened interior of the preform along a longitudinal axis and via an opened rearward end distal from the sensing coil disposed at a forward most end of the preform.

Another further object of the present invention is to provide the proximity probe manufacturing method as characterized above which includes cantilevering between an upper and a lower mold plate an end of the support pin emanating from the opened rearward end of the preform for interiorly supporting the coil and preform assembly within a mold cavity defined by the upper and lower mold plates such that the coil and preform assembly is supported from within the preform by the support pin coacting with the opened interior of the preform.

Another further object of the present invention is to provide the proximity probe manufacturing method which includes molding an encapsulation of material over the coil and preform assembly for forming the encapsulated proximity probe tip and forming in such molding step a through bore passing through a sidewall of the encapsulation and terminating in open communication with the opened interior of the preform such that solder can be passed through the sidewall of the encapsulation to a braided conductor of a cable that has been previously inserted into the opened interior of the preform via an opened back end of the encapsulation and the opened rearward end of the preform wherein when the solder is melted it flows along the braided conductor and into contact with an interior of a ferrule disposed within the opened interior of the preform for electrically and mechanically connecting the braided conductor to the encapsulated proximity probe tip.

Another further object of the present invention is to provide the proximity probe manufacturing method which includes molding at the forward most end of the preform a annular recess having a hollow interior circumscribing and defining an opening of a blind bore internally disposed within the preform along its longitudinal axis.

Yet another further object of the present invention is to provide the proximity probe manufacturing method which includes affixing the sensing coil having a hollow interior to the annular recess by mounting the sensing element via its hollow interior on a mounting pin, passing the mounting pin through the hollow interior of the annular recess and into the blind bore of the preform such that the coil is centered along the longitudinal axis of the preform and such that a back face of the coil having adhesive disposed thereon abuts an annular ledge of the annular recess.

Still yet another further object of the present invention is to provide a proximity probe and a proximity probe manufacturing method which eliminates costly machining of internal threads into a metal case which typically circumscribes the encapsulation of the encapsulated proximity probe tip by providing a metal casing having a geometrical opening within the metal casing, placing the metal casing on the encapsulated proximity probe tip, linearly positioning the metal casing on the encapsulated proximity probe tip at a location relative to the coil and heating the encapsulation proximate the geometrical opening such that a melted portion of the encapsulation is displaced into the geometrical opening for interlocking the metal casing to the encapsulation at the linearly positioned location.

These and other objects and advantages will be made manifest when considering the following detailed specification when taken in conjunction with the appended drawing figures.

BRIEF DESCRIPTION OF THE DRAWINGS

FIG. 12 is a partial exploded parts view of parts to be assembled for forming the encapsulated proximity probe pursuant to the present invention.

FIG. 13 is an exploded parts view of the encapsulated proximity probe and of a casing shown in cross-section pursuant to one form of the present invention.

FIG. 14 is an exploded parts view of the encapsulated proximity probe and of a casing shown in cross-section pursuant to another form of the present invention.

FIG. 15 is partial cross-sectional view of the casing that is shown in FIG. 14 being interlocked to the encapsulated probe tip pursuant to the present invention.

DESCRIPTION OF PREFERRED EMBODIMENTS

Figure 1:
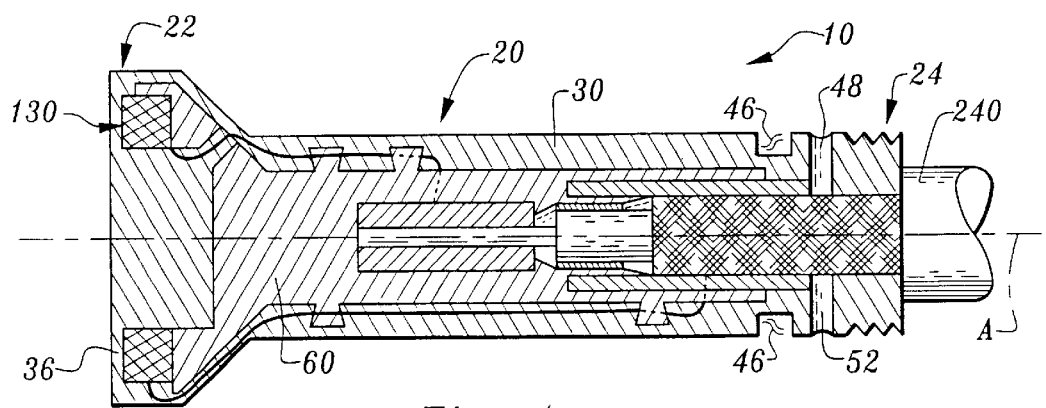
FIG. 1 is a partial sectional view of an encapsulated proximity probe pursuant to the present invention.

Considering the drawings, wherein like reference numerals denote like parts throughout the various drawing figures, reference numeral 10 is directed to the encapsulated proximity probe pursuant to the present invention.

Figure 9:
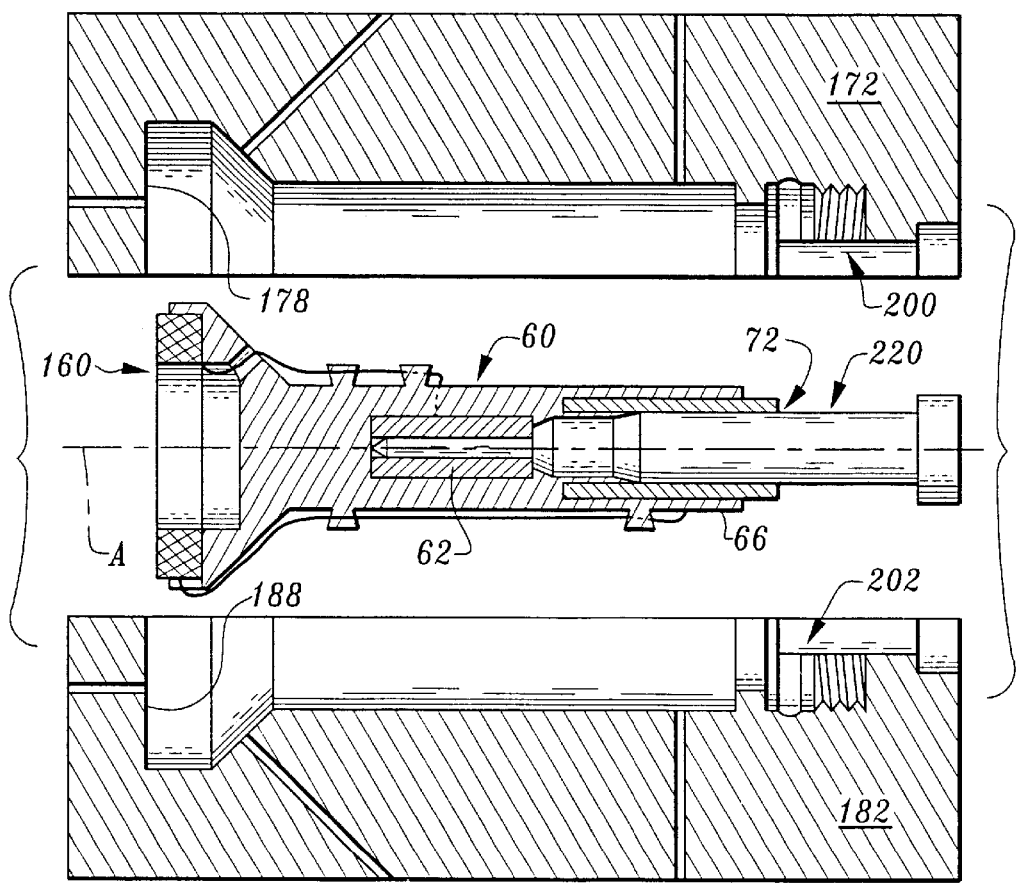
FIG. 9 is a simplified cross-sectional view of the mold in the open position and showing the centering pin supporting the coil and preform assembly pursuant to the present invention.

In its essence, and referring to FIG. 1, the proximity probe 10 pursuant to the present invention is comprised of an elongated encapsulated probe tip 20 having a sensing coil 130 disposed proximate a front end 22 and a cable 240 emanating from a back end 24. The elongated encapsulated probe tip 20 includes a longitudinal axis "A" and is comprised of a monolith of cured moldable material defining an encapsulation 30 ensconcing the coil 130 and a preform 60. The elongated encapsulated probe tip 20 is manufactured by first forming the preform 60. The coil 130 is then attached to the preform 60 and tuned. Once tuned, the coil 130 is permanently and electrically connected to the preform thereby completing the formation of a coil and preform assembly 160 (please see FIG. 6). The coil and preform assembly 160 is then supported on a single axial centering or support pin 220 traversing through an opened rearward end 72 of the preform 60 as shown in FIG. 9. Next, and referring to FIG. 10, the coil and preform assembly 160 is supported within a mold cavity via the support pin 220 and encapsulated with moldable material thereby completing the formation of the elongated encapsulated probe tip 20. The elongated encapsulated probe tip 20 is electrically connectable to any length of cable 240 for forming the proximity probe 10 pursuant to the present invention.

Figure 2:
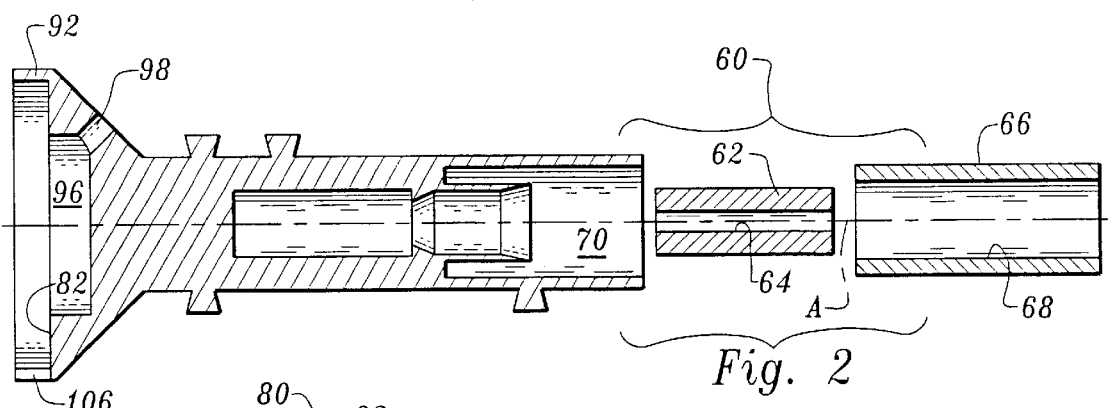
FIG. 2 is a cross-sectional exploded parts view of a preform of the proximity probe pursuant to the present invention.
Figure 3:
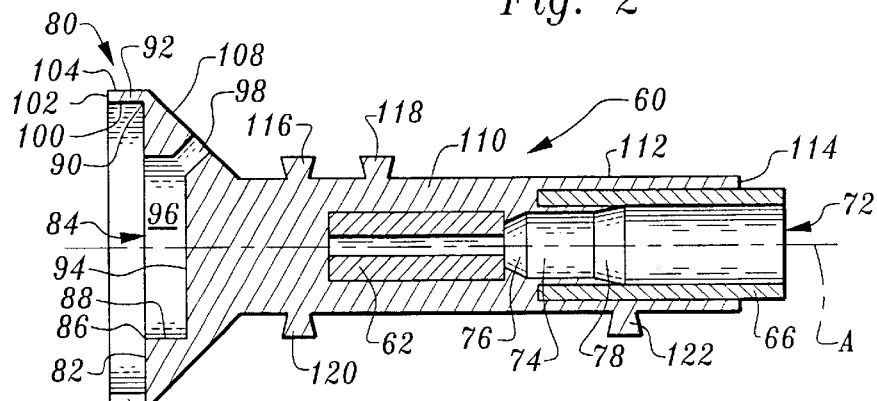
FIG. 3 is a cross-sectional view of the preform comprised of the elements shown in FIG. 2.

More specifically, and referring to FIG. 2, there is shown an exploded parts view of the preform 60 which is formed in a first molding process. The preform includes a front ferrule 62 having a first bore 64 and a rear ferrule 66 having a second bore 68. The inner diameters of the bores 64, 68 are sized to receive conductors of the cable 240 as further delineated hereinbelow. The ferrules 62, 66 are both preferably placed on a ferrule support pin disposed within a mold shaped complementary to the desired form of the preform as shown in FIG. 2. Moldable material is then molded around the support pin, the front ferrule 62, and the rear ferrule 66 such that an internal cavity 70 is formed which circumscribes the front and rear ferrules 62, 66 and such that the ferrules 62, 66 are inner-locked and linearly spaced apart along the long axis "A" thereby forming the preform 60 as shown in FIG. 3. Preferably, the front and rear ferrules 62, 66 are formed of brass and the moldable material has the characteristic of being a dielectric (an electrical insulating material) and of bonding to itself. Polyphenylene sulfide (PPS) is one example of moldable material that has both of these characteristics.

Referring FIG. 3, the internal cavity 70 includes a bridging section 74 of substantially constant cross-sectional area traversing between a front and rear truncated cone 76, 78 which isolate the front and rear ferrules 62, 66. Thus, the internal cavity 70 can be defined by the bridging section 74, the front truncated cone 76, the rear truncated cone 78, and the bores 64, 68 of the respective ferrules 62, 66.

A forward most end 80 of the preform 60 includes an internal annular ledge 82 having a hollow interior 84. The internal annular ledge 82 includes an inner lateral extremity 86 transitioning into a longitudinally extending cylindrical inner sidewall 88 terminating to a bottom annular surface 94 and an outer lateral extremity 90 transitioning into a longitudinally extending cylindrical outer sidewall 92 wherein the inner sidewall 88 and the bottom surface 94 define a centering bore and wherein the hollow annular ledge 82 and the longitudinally extending cylindrical outer sidewall 92 define an aimular recess skirting the centering bore. The cylindrical inner and outer sidewalls 88, 92 are coaxially aligned and radially spaced apart from one another and axially extend away from the annular ledge 82 in opposite directions as shown in FIG. 3.

More particularly, the cylindrical inner sidewall 88 terminates at the bottom annular surface 94 such that the cylindrical inner sidewall 88 and the bottom annular surface 94 define the centering or internal blind bore 96 having axis substantially concentric with the longitudinal axis "A" of the preform and having a front opening defined by the hollow interior 84 of the internal annular ledge 82. Hence, the blind bore 96 is disposed within the preform 60 such that the hollow interior 84 of the internal annular ledge 82 and the blind bore 96 are in open communication with one another. The blind bore 96 further includes an angled passageway 98 that extends through a junction between the inner sidewall 88 and the bottom annular surface 94 of the blind bore 96.

The cylindrical outer sidewall 92 skirts the outer lateral extremity 90 of the annular ledge 82 and includes a cylindrical interior surface 100 longitudinally extending away from the annular ledge 82 and terminating into an outer circumferential front face 102 of the preform 60 which in turn transitions into a cylindrical exterior surface 104 of the outer sidewall 92. A notch 106 is disposed through the cylindrical outer sidewall 92 and extends from the outer circumferential front face 102 of the preform 60 to the annular ledge 82.

The cylindrical exterior surface 104 of the outer sidewall 92 transitions into a frustum shaped surface 108 defined by a descending slope being rotated about the longitudinal axis "A." In turn, the frustum shaped surface 108 transitions into an elongated cylindrical section 110 that includes an elongated exterior surface 112 terminating at an outer circumferential back face 114 of the preform 60.

Preferably, the elongated cylindrical section 110 of the preform 60 includes a first pair of axially spaced apart tabs 116, 118 and a second pair of axially spaced apart tabs 120, 122. Each respective tab 116, 118, 120, and 122 radially protrudes from and is inwardly tapered toward the elongated exterior surface 112 of the preform 60. The first pair of tabs 116, 118 is preferably circumferentially spaced from the second pair of tabs 120, 122 by an angle of about one hundred eighty degrees and the tabs 116, 118 included in the first pair preferably have an axial spacing therebetween that is less than the axial spacing between the tabs included in the second pair of tabs 120, 122.

Figure 4:
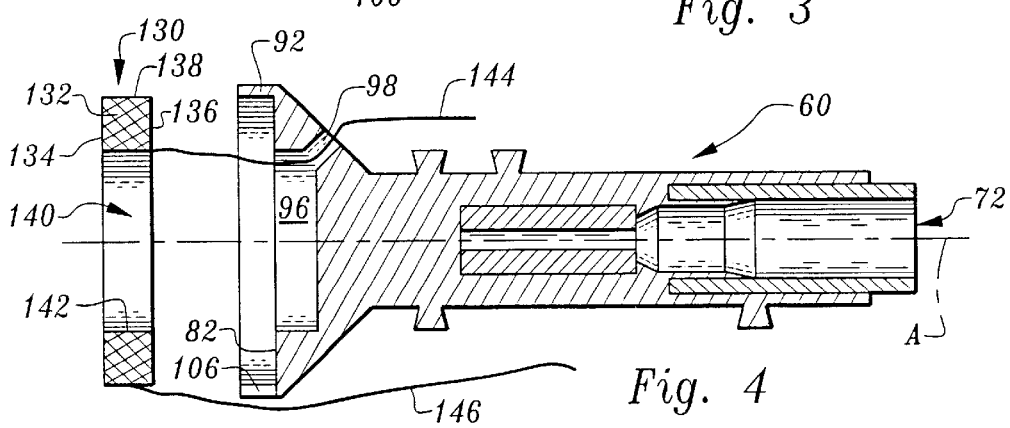
FIG. 4 is a cross-sectional view of the preform shown in FIG. 3 and further showing a cross-sectional view of a coil prior to it being attached to the preform and pursuant to the present invention.

Referring to FIG. 4, the sensing coil 130 is comprised of body 132 of wound wire having a front face 134, a back face 136, an exterior side surface 138, a center void 140 defined by a hollow interior having an interior surface 142, a first lead 144, and a second lead 146. The coil 130 is preferably affixed to the annular recess by way of the annular ledge 82 and/or to the longitudinally extending cylindrical outer sidewall 92 of the preform 60.

Figure 5:
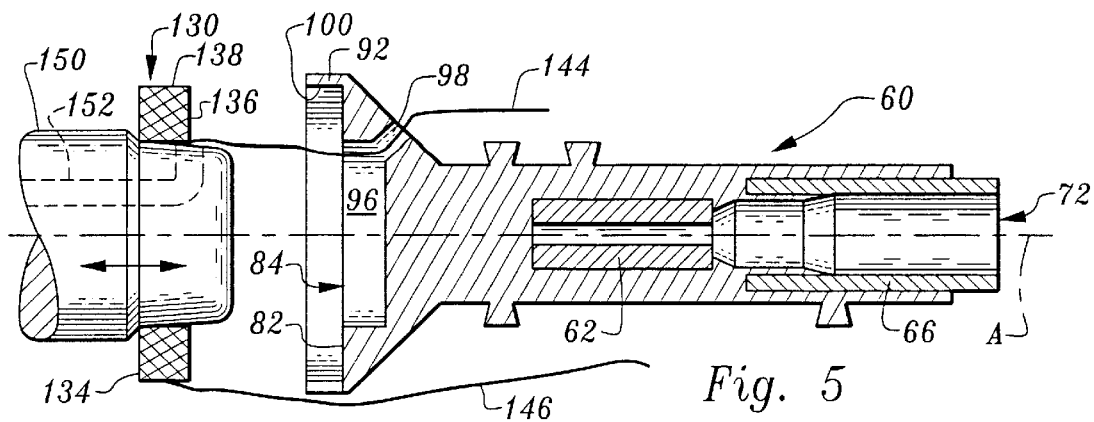
FIG. 5 is a diagrammatic view of an assembly step employing a coil mounting pin and showing the coil mounted thereon prior to being attached to the preform pursuant to the present invention.

Referring to FIG. 5, the coil 130 can be affixed to the annular ledge 82 by first mounting the coil 130 on a mounting pin 150 that can be a handheld tool or a tool that is part of an automated apparatus. A portion of the mounting pin 150 is then passed through the hollow interior 84 of the annular ledge 82 and into the centering bore 96 of the preform 60 for centering the coil along the longitudinal axis "A" and abutting the back face 136 of the coil 130 against the annular ledge 82. An adhesive placed on the back face 136 of the coil 130 prior to or after mounting the coil 130 on the mounting pin 150, the coil 130 can be affixed to the annular ledge 82 when placed in abutment therewith. Additionally or alternatively, the adhesive could be placed on one or more of the following surfaces: the exterior side surface of the coil 138, the annular ledge 82 of the preform 60, and/or the cylindrical interior surface 100 of the longitudinally extending cylindrical outer sidewall 92 of the preform 60.

Once the coil 130 has been affixed to the preform 60 it can be tuned by pulling turns of wire from the center of the coil 130. This can be accomplished by hand or with a tool after the mounting pin 150 is removed from the center void 140 of the coil 130. Alternatively, a passageway 152 may be provided within the mounting pin 150 such that the first lead 144 of the coil 130 can be pulled through this passageway to remove turns of wire from the center of the coil 130. Thus, the hollow interior 84 of the annular ledge 82 and the blind bore 96 allow employment of the mounting pin 150 for precisely mounting the coil 130 and allow the coil 130 to be tuned or adjusted to resonate or operate at a specified frequency by removing turns of wire from the center of the coil 130 after being connected to the preform and while in the presence of the ferrules 62, 66. Additionally, the cable 160 can be temporarily inserted into the preform 60 such that the coil 130 can be tuned in the presence of the ferrules 62, 66 and cable 160. Thus, the effect of the ferrules 62, 66 and/or cable 160 on the desired resonating or operating frequency of the coil 130 can be accounted for by the present invention during the manufacturing of the proximity probe 10 thereby providing a more precise proximity probe 10 that requires less external calibration and that provides more accurate and reliable measurements over a wide range of circuit and environmental conditions.

Figure 6:
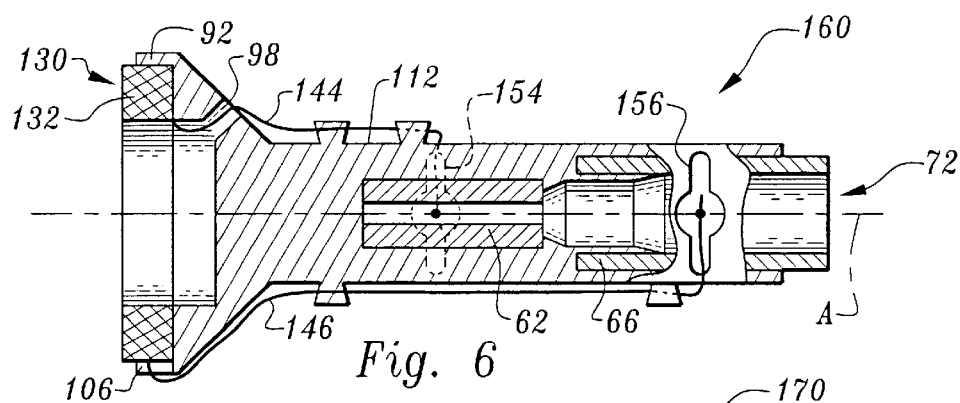
FIG. 6 is a partial sectional view of a coil and preform assembly formed by the assembly step shown in FIG. 5 and by the connection of elements shown in FIG. 4.

Referring to FIG. 6, the leads 144, 146 of the coil 130 are connected to the ferrules 62, 66 disposed within the preform after the coil 130 has been affixed to the preform 60 and tuned. This is accomplished by threading the first lead 144 of the coil 130 through the angled passageway 98 to the exterior of the preform 60 and then running it adjacent the elongated exterior surface 112 of the preform 60 and then dropping it down a front preform passage 154 to the front ferrule 62 wherein it is connected thereto via, for example, induction welding. The connection of the second lead 146 of the coil is accomplished by passing the second lead 146 of the coil 130 through the notch 106 disposed in the cylindrical outer sidewall 92 that skirts the annular ledge 82 and then running it adjacent the elongated exterior surface 112 of the preform 60 and then dropping it down a rear preform passage 156 to the rear ferrule 66 wherein it is connected thereto via, for example, induction welding. With the coil 130 affixed to the preform 60, tuned and connected to the ferrules 62, 66 the formation of a coil and preform assembly 160 is complete and ready to be encapsulated, as will be delineated hereinbelow.

Figure 7:
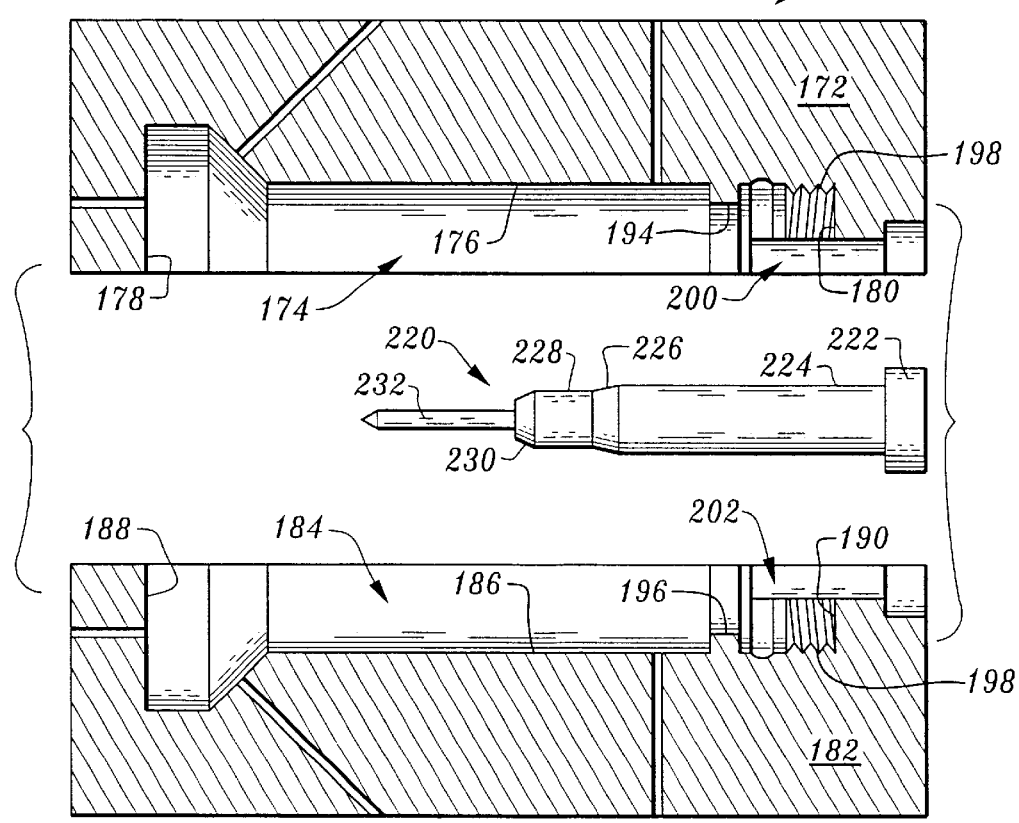
FIG. 7 is a simplified cross-sectional view of a mold in an open position and of a centering pin pursuant to the present invention.

Referring to FIG. 7, there is a shown an injection mold 170 defined by an upper mold plate 172 having an upper cavity 174 and a lower mold plate 182 having a lower cavity 184 forming a single mold cavity 192 when in the closed position (please see FIG. 7). The mold cavity 192 is shaped complementary to the desired form of the encapsulation 30 ensconcing the coil and preform assembly 160 as shown in at least FIG. 1. An upper sidewall 176, a lower sidewall 186, an upper front wall 178, a lower front wall 188, an upper back wall 180, and a lower back wall 190 define the mold cavity 192.

The upper mold plate 172 includes a semi circumferential protrusion 194 extending from the upper sidewall 176 at a location proximate the upper back wall 180 of the upper mold cavity 174. Similarly, the lower mold plate 182 includes a semi circumferential protrusion 196 extending from the lower sidewall 186 at a location proximate the lower back wall 190 of the lower mold cavity 184. When the mold 170 is in the closed position the pair of semi circumferential protrusions 194, 196 form a continuous protrusion that forms an exterior circumferential groove 46 around the encapsulation 30 such that a seal 300 can be received therein (please see FIGS. 13 and 14). The upper mold plate 172 further includes an upper centering pin cavity 200 and the lower mold plate further includes a lower centering pin cavity 202 forming a single centering pin cavity 204 when the mold is in the closed position (please see FIG. 8).

Figure 8:
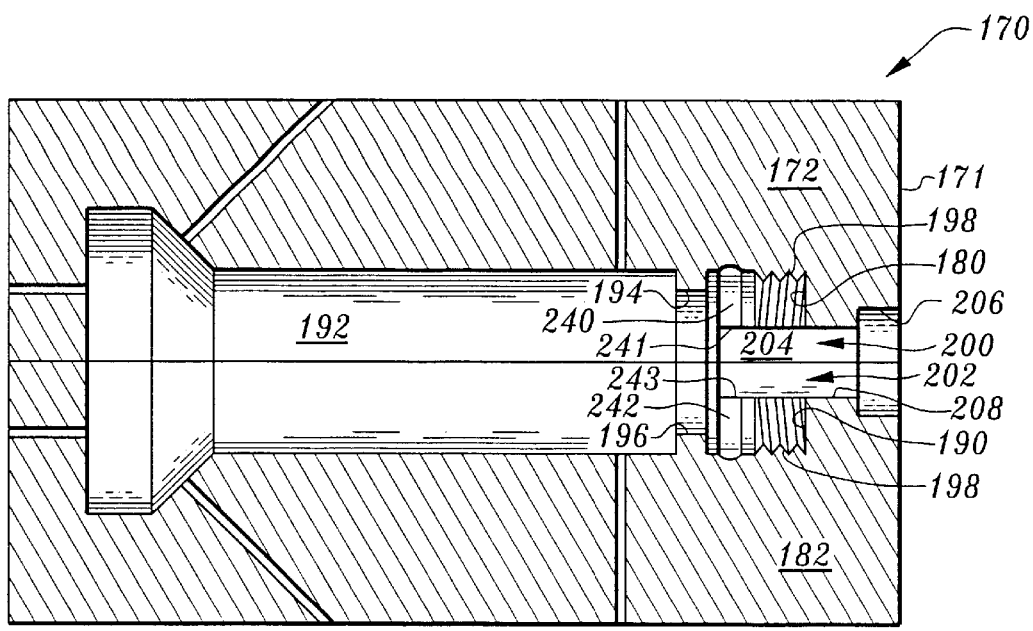
FIG. 8 is a simplified cross-sectional view of the mold in closed position and without the centering pin.

Specifically, and referring to FIGS. 7 and 8, the upper centering pin cavity 200 and the lower centering pin cavity 202 form the single centering pin cavity 204 having a T-shaped configuration comprised of a rectangularly shaped top branch 206 and a cylindrically shaped bottom branch 208. The top branch 206 is disposed on the outside of the mold cavity 192 at a location proximate a back end 171 of the mold 170. The bottom branch 208 longitudinally extends away from the top branch 206 and terminates within the mold cavity 192 after passing through the upper back wall 180 and the lower back wall 190 of the mold cavity 192.

Referring back to FIG. 7, the mold 170 further includes a centering pin 220 comprised of a rectangular base 222 that transitions into an elongated cylindrical body 224. The elongated cylindrical body transitions into a first tapered section 226 and a second tapered section 230 separated by a cylindrical bridge 228. The second tapered section 230 transitions into an elongated needle nose 232 that forms a front end of the centering pin 220. The rectangular base 222 and the elongated cylindrical body 224 are respectively complemental in shape to the rectangularly shaped top branch 206 and the cylindrically shaped bottom branch 208 of the centering pin cavity 204 as shown in FIG. 8. Thus, the rectangular base 222 and the elongated cylindrical body 224 of the centering pin 220 can be received within the T-shaped centering pin cavity 204 disposed within the mold 170. In turn, the elongated cylindrical body 224, the first tapered section 226, the cylindrical bridge 228, the second tapered section 230, and the elongated needle nose 232 are preferably formed to be closely received within the rear ferrule 66, the rear truncated cone 78, the bridging section 74, the front truncated cone 76 and the front ferrule 62, respectively. Thus, the centering pin 220 can be passed through the opened rearward end 72 of the preform 60 and into the internal cavity 70 of the preform 60 such that the coil and preform assembly 160 can be supported on the centering pin 220. The centering pin 220 can be sized to freely or frictionally fit within the internal cavity 70 of the preform 60. While supporting the coil and preform assembly 160, the centering pin 220 can be placed within the lower centering pin cavity 202 and cantilevered between the upper and lower mold plates 172, 182 when the mold 170 is placed in the closed position. Thus, a single non-retractable axial centering pin 220 is employed to center, align, and support the coil and preform assembly 160 within the mold cavity 192 defined by the upper and lower mold plates 172, 182 after being received within the interior of the preform 60 via the opened rearward end 72.

Referring again to FIGS. 7 and 8, the mold cavity 192 preferably also includes a first stanchion 240 and a second stanchion 242 that are preferably diametrically opposed from one another and interposed between the semi circumferential protrusions 194, 196 and the back walls 180, 190 of the mold cavity 192. The first stanchion 240 radially extends away from the upper sidewall 176 of the upper cavity 174 and terminates at an end 241. The second stanchion 242 radially extends away from the lower sidewall 186 of the lower cavity 184 and terminates at end 243. Both stanchions 240, 242 remain in place during the encapsulation process thereby forming a first through bore 48 and a second through 52 (please see FIG. 1) in the cured molded material or encapsulation 30.

Referring to FIG. 9, and with the mold structure clearly delineated hereinabove, the encapsulation process will now be explored in detail. At the outset, the centering pin 220 is passed through the opened rearward end 72 of the preform 60 and into the internal cavity 70 and ferrules 62, 66 of the preform 60 for supporting the coil and preform assembly 160 thereon.

Figure 10:
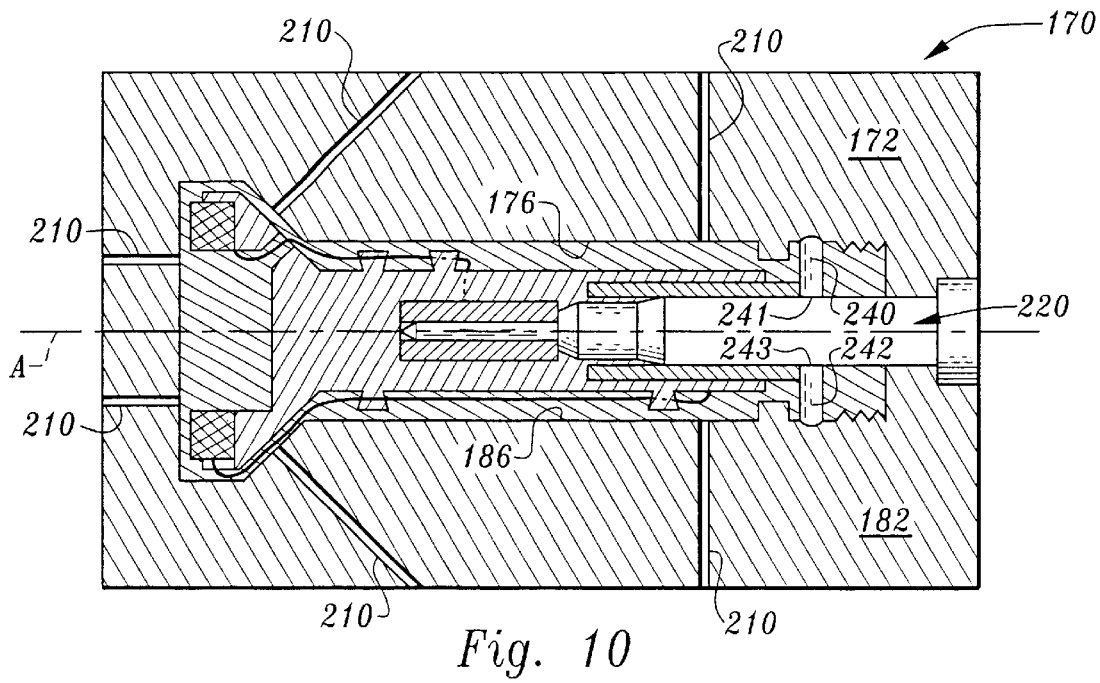
FIG. 10 is a simplified cross-sectional view of the mold in the closed position and showing the centering pin supporting the coil and preform assembly and being cantilevered at one end by the closed mold, the coil and preform assembly shown encapsulated by an injection molding process thereby forming an encapsulated probe tip pursuant to the present.

Referring to FIGS. 9 and 10, the centering pin 220 is then cantilevered between the upper and lower mold plates 172, 182 by first placing the centering pin 220 within the lower centering pin cavity 202 and then placing the mold in the closed position (FIG. 10) thereby cantilevering the centering pin 220 between the upper and lower centering pin cavities 200, 202 such that the coil and preform assembly 160 is axially and radially located and supported within the mold cavity 192 with a single non-retractable axial centering pin 220 that extends through the opened rearward end 72 of the preform 60. Additionally, the cantilevered single non-retractable axial centering pin 220 supports the coil 130 such that its front face 134 is a precise distance from the upper and lower front walls 178, 188 of the mold cavity 192 thereby allowing the elongated encapsulated probe tip 20 to have an integrally formed front protective wall 36 (FIG. 11) having a uniform thickness and thus, a predetermined linear range. This is particularly important when manufacturing a plurality of encapsulated probe tips that are all suppose to have the same electrical characteristics.

Moreover, and referring to FIGS. 7 and 10, when the centering pin 220 is supporting the coil and preform assembly 160 and is placed within the lower centering pin cavity 202 and the mold 170 closed, the first stanchion 240 radially extends away from the upper side wall 176 of the upper cavity 174 and the second stanchion 242 radially extends away from the lower side wall 186 of the lower cavity 184 such that both stanchions 240, 242 radially extend along an exterior surface of the rearward opening 72 of the preform 60 and terminate in an abutting relationship with the cantilevered centering pin 220. In other words, the respective ends 241, 242 of the stanchions 240, 242 are in an abutting relationship with the cantilevered centering pin 220. The stanchions remain in place during the encapsulation process thereby forming the bores 48, 52 (FIG. 11) in the cured molded material or encapsulation 30.

Referring to FIG. 10, the moldable material is injected into the mold cavity via one or more passageways 210 provided in the lower mold plate 182 and/or the upper mold plate 172. The injection of the moldable material is continued until the mold cavity 192 is completely filled and the coil and preform assembly 160 is completely ensconced within the moldable material wherein the encapsulated coil and preform assembly defines the elongated encapsulated probe tip 20 of the encapsulated proximity probe 10. The moldable material is preferably polyphenylene sulfide (PPS), which has the characteristic of bonding to itself.

Figure 11:
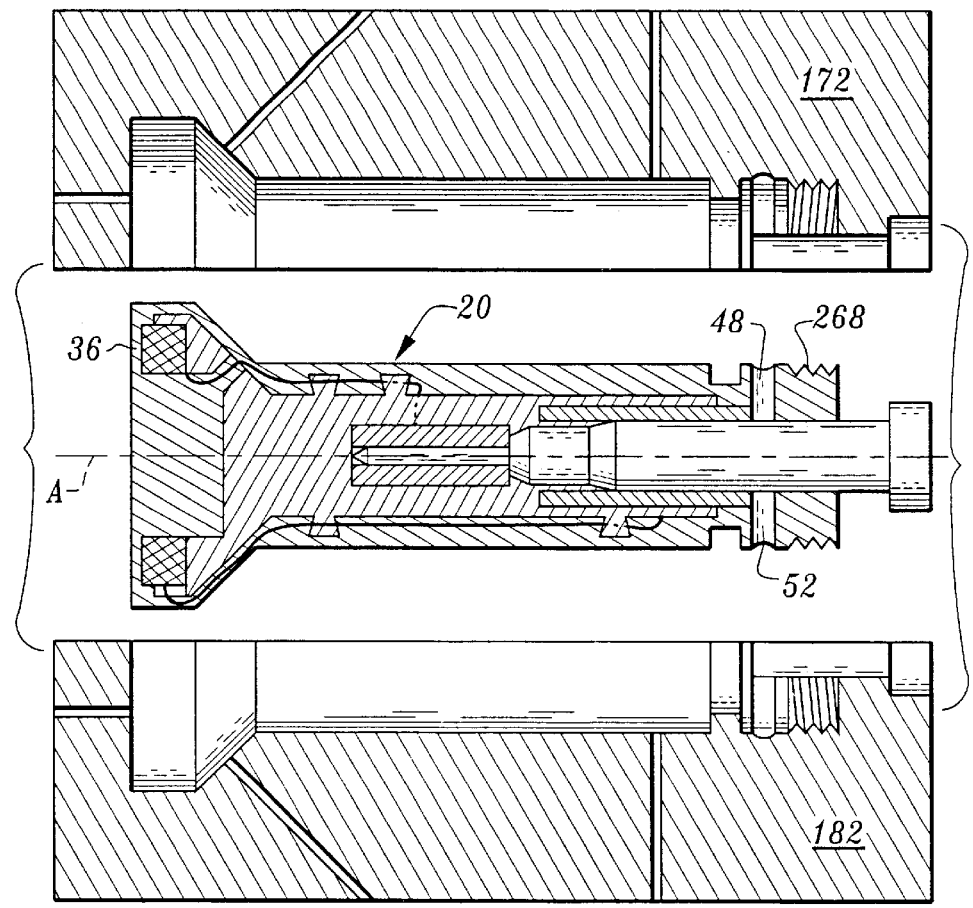
FIG. 11 is a simplified cross-sectional view of the mold in the open position and a partial sectional view of the encapsulated probe tip and centering pin removed from the opened mold pursuant to the present invention.

Referring to FIG. 11, once the elongated encapsulated probe tip 20 has cured enough to retain its form the mold 170 may be opened and the elongated encapsulated probe tip 20 may be allowed to cool in the lower mold plate 182. When cooled, the elongated encapsulated probe tip 20 can be removed from the lower mold plate 182 by lifting out the centering pin 220 and/or by, for example, employing one or more ejector pins used only to eject the elongated encapsulated probe tip 20 from the lower mold cavity 182.

Then, transitioning from FIG. 11 to FIG. 12 shows that the freely or frictionally fitted centering pin 220 is removed from the internal cavity 70 of the preform 60 prior to coupling the cable 240 to the elongated encapsulated probe tip 20.

Referring to FIG. 12, the encapsulation 30 formed by the injection molding process includes a forward end 32, a head 34, an inwardly tapering shoulder 42, an elongated cylindrical body 44, and an opened back end 56. The head 34 of the encapsulation includes a front wall 36 having substantially uniform thickness immediately in front of the front face 134 of the coil 130 such that the front wall 36 contacts and contours to the entire front face 134 of the coil 130. The front wall 36 transitions into a center post 38 that is integrally formed with the front wall and traverses through the hollow interior 140 of the coil 130, past the back end 136 of the coil 130 and into the blind bore 96 of the preform 60 such that it contacts and contours to the interior surface 142 of the coil 130, the longitudinally extending cylindrical inner sidewall 88 of the preform 60, and the bottom annular surface 94 of the blind bore 96 thereby interlocking the encapsulation 30 into the preform 60 by integrally molding moldable material with said encapsulation 30 that extends through and fills in the center void 140 of the coil 130 and that extends into and fills in the blind centering bore 96 of the preform 60. The front wall 36 also transitions into an integrally formed outermost cylindrical sidewall 40 that circumscribes the cylindrical exterior surface 104 of the outer sidewall 92 of the preform 60 and the exterior side surface 138 of the coil 130. The outermost cylindrical sidewall 40 transitions into the inwardly tapering shoulder 42 that is followed by the elongated cylindrical body 44 that terminates at the opened back end 56 of the encapsulation 30. As mentioned hereinabove, the elongated cylindrical body 44 includes the circumferential groove 46 disposed proximate the opened back end 56 of the encapsulation 30 for receiving seal 300 therein. The elongated cylindrical body 44 further includes, as also mentioned hereinabove, the first elongated bore 48 having a first end 49 and second end 50, and the second elongated bore 52 having a first end 53 and a second end 54. Preferably, the elongated bores 48, 52 are perpendicularly disposed in the encapsulation 30 with respect to the longitudinal axis "A" and extend through the encapsulation 30 to the internal cavity 70.

Still referring to FIG. 12, there is shown an exploded parts view of the proximity probe 10 comprising the elongated encapsulated probe tip 20 and the cable 240. In one preferred form, the cable 240 is a coaxial cable comprised of an outer insulator 242 circumscribing an interior of the cable which includes two concentrically disposed conductors 244, 248 separated from one another by a dielectric or insulator 246. More specifically, the outer insulator 242 circumscribes the concentrically disposed braided coaxial conductor 244 and center conductor 248 which are separated from one another by the dielectric or insulator 246. At least one end 250 of the cable 240 is stripped in a step-like fashion as shown in order to expose a length of the center conductor 248, the dielectric 246, and the braided coaxial conductor 244.

The parts shown in FIG. 12 are assembled by first placing an elastomeric sleeve 262 over the dielectric 246 of the cable 240. The elastomeric sleeve 262 includes an inner diameter that substantially matches the outer diameter of the dielectric 246 and an outer diameter that is slightly larger than the bridging section 74. The elastomeric sleeve 262 may be of an insulating material such as fluorosilicone rubber. Next, solder paste 260 is inserted into the bore 64 of the front ferrule 62 preferably, via a syringe which is pneumatically driven so as to dispense a uniform predetermined amount of paste which is reproducible every time. The stripped end 250 of the cable 240 is then passed through the opened back end 56 of the encapsulation 30 and into the internal cavity 70 such that the center conductor 248 mates with the front ferrule 62 and the braided coaxial conductor 244 mates with the rear ferrule 66. The insertion of the cable 240 with an axial force causes the elastomeric sleeve 262 to deform against the conical transition between the bridging section 74 and the rear truncated cone 78. This provides a tight seal between this transition area and the dielectric 246 as shown in FIG. 1. At this time the center conductor may be electrically and mechanically connected to the elongated encapsulated probe tip 20 by employing inductive heating to melt the solder paste 260 disposed within the bore of the front ferrule 62 such that the solder paste 260 flows between the center conductor 248 and the front ferrule 62 and when cooled, permanently affixes the center conductor to the bore of the front ferrule 62 thereby electrically and mechanically connecting the elongated encapsulated probe tip 20 to the cable 240. Balls of solder or solder paste 264 are then inserted into least one of the through bores 48, 52 and preferably, balls of solder or solder paste 264 are inserted into both of the through bores such that the balls of solder or solder paste 264 contact the coaxial or braided conductor 244. The balls of solder or solder paste 264 are preferably dispensed in a uniform predetermined amount that is reproducible every time. Use of inductive heating may then be employed to melt the solder balls or paste 264 disposed within the through bores 48, 52 of the encapsulation such that the solder flows or is wicked between the braided coaxial conductor 244 and the bore or interior of the rear ferrule 66 and when cooled, permanently affixes the braided conductor 244 to the bore 62 of the rear ferrule 66 thereby electrically and mechanically connecting the elongated encapsulated probe tip 20 to the cable 240. Alternatively, inductive heating may be employed to simultaneously melt the solder paste 260 and the balls of solder or solder paste 264 such that the center conductor and the braided conductor are affixed to the bores 64, 68 of the front and rear ferrules 62, 66, respectively.

Referring to FIG. 13, the elongated encapsulated probe tip 20 is typically circumscribed by a metal case 266 having internal threads 267. Prior to coupling the metal case 266 to the encapsulated probe tip 20 the seal or O-ring 300 is inserted into the circumferential grove 46. Then, the metal case 266 is slid onto the cable 240 and threadedly coupled to the encapsulated probe tip 20 by the coaction of the internal threads 267 with complemental external threads 268 integrally formed with the elongated encapsulated probe tip 20. Additionally or alternatively, the metal case 266 was heretofore crimped to the elongated encapsulated probe tip by bending a portion 269 of the metal case onto the elongated encapsulated probe tip 20.

Referring to FIG. 14, a new, novel, and useful metal case 270 and method of interlocking the elongated encapsulated probe tip with the metal case 270 are provided by the present invention. The metal case 270 is comprised of an elongated cylindrical structure 272 having a sidewall 274 defining a bore 276 transitioning from a leading end 278 to a trailing end 280 of the structure 272. The bore 276 is comprised of a first section 282 sized to receive the elongated cylindrical body 44 of the encapsulation 20 and a second section 284 sized to receive cable 240. The sidewall further includes external threads 286, a crimp or neck area 288, and at least one geometrically shaped opening 290 that is disposed through the sidewall 274 and terminates in the bore 276. Preferably, the at least one geometrically shaped opening 290 is disposed through the crimp area 288 of the sidewall 274 at a location proximate the leading end 278 of the structure.

Referring to FIGS. 14 and 15, the method of interlocking the elongated encapsulated probe tip 20 onto the metal case 270 includes the steps of inserting the seal or O-ring 300 into the circumferential grove 46, sliding the metal case 270 onto the cable 240 and then onto the elongated encapsulated probe tip 20 such that the first section 282 circumscribes the elongated cylindrical body 44 and the second section 284 circumscribes a portion of the cable 240 emanating from the back end 56 of the encapsulation 30. Next, applying heat to the crimp area 288 so as to melt and displace the moldable material along the crimp area 288 proximate the at least one geometrically shaped opening 290 such that a key 289 of moldable material is formed and fills the opening 290 for interlocking the elongated encapsulated probe tip 20 with the metal case 270. It should be noted that a plurality of openings 290 may be disposed through the sidewall 274 and terminate in the bore 276 for allowing a plurality of keys 289 of moldable material to be formed within the openings 290 for interlocking the elongated encapsulated probe tip 20 into the metal case 270.

Hence, the above delineated method of interlocking the elongated encapsulated probe tip 20 onto the metal case 270 has the advantage of, inter alia, eliminating the extremely costly need to machine internal threads (threads 267 shown in FIG. 13) into the metal case. Moreover, the forming threads 198 of mold 170 as shown in FIG. 8 can be eliminated thereby eliminating the cost of machining threads 198 into mold 170. Hence, the resulting encapsulation, as shown in FIGS. 14 and 15, is void of the external threads 268.

Moreover, the metal case 270 and the method pursuant to the present invention allows the case 270 to be linearly positioned onto the probe tip 20 in increments that are smaller than that which is obtained by using threads to linearly position the case for thereby providing means for making more precise case trim adjustments or fine tuning of the inductance, resistance and/or capacitance of the proximity probe 10 by locating the case with respect to the coil 130. Thus, the metal case 270 and the method of interlocking the elongated encapsulated probe tip 20 into the metal case pursuant to the present invention contributes to increasing the accuracy and reliability of the proximity probe 10.

Figure 16:
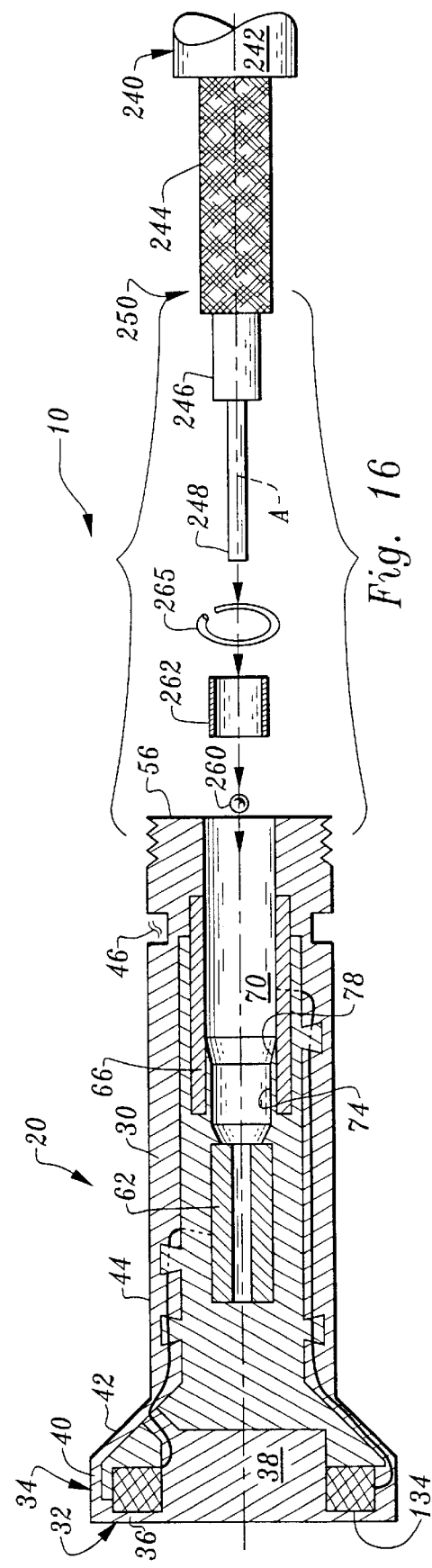
FIG. 16 is a cross-sectional view of an alternative embodiment of an encapsulated proximity probe tip and an assembly method of components for forming an encapsulated proximity probe pursuant to the present invention.
Figure 17:
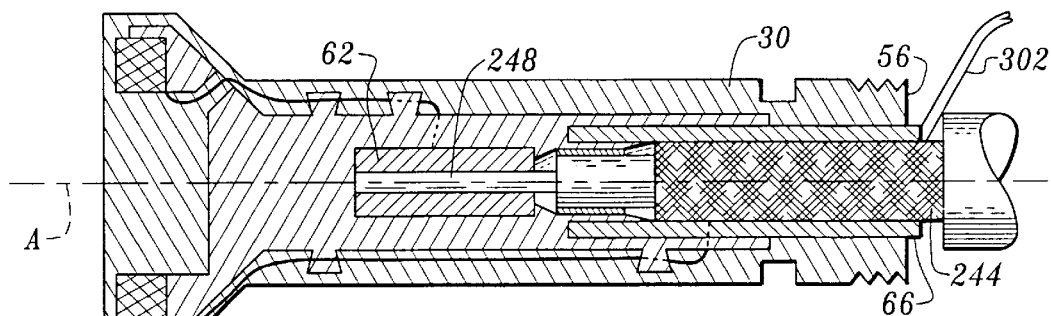
FIG. 17 is a cross-sectional view of another alternative embodiment of an encapsulated proximity probe tip and an assembly method of components for forming an encapsulated proximity probe pursuant to the present invention.
Figure 18:
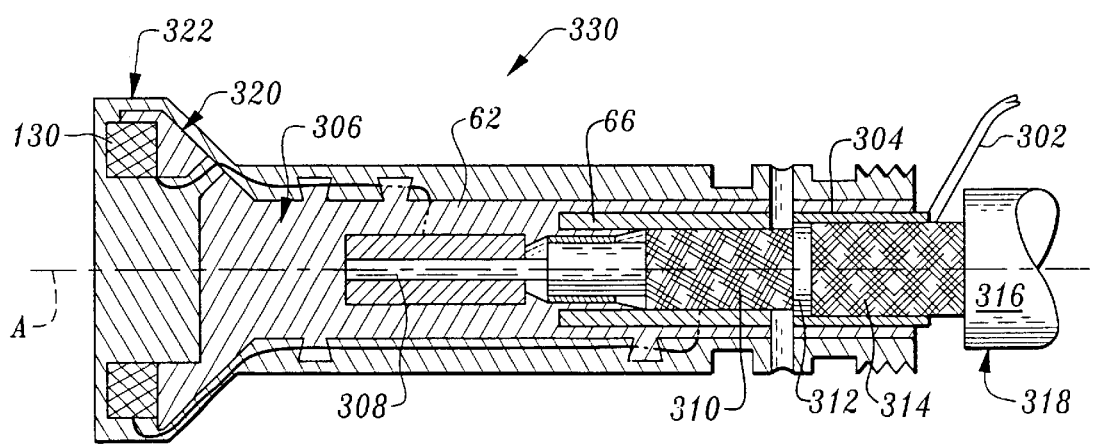
FIG. 18 is a cross-sectional view of another alternative embodiment of an encapsulated proximity probe tip and an assembly method of components including a triaxial cable for forming an encapsulated proximity probe pursuant to the present invention.

Referring to FIG. 16, and in accordance with an alternative embodiment of the present invention, the stanchions 240, 242 may be removed the mold 170 thereby resulting in an encapsulation that is devoid of through bores 48, 52. In this situation, the solder balls 264 are replaced by a solder ring 265 or paste that is placed over the braided conductor prior to the stripped end 250 of the cable 240 being passed through the opened back end 56 of the encapsulation 30 and into the internal cavity 70 as delineated hereinabove. The solder paste 260 and the solder ring 265 can then be simultaneously or sequentially melted by, for example, inductive heating such that the center conductor and the braided conductor are affixed to the bores 64, 68 of the front and rear ferrules 62, 66, respectively Referring to FIG. 17, and in accordance with an alternative embodiment of the present invention, the coil and preform assembly 160 can be supported on the centering or support pin 220 and the pin 220 can then be located within the mold cavity as delineated hereinabove. The axial and radial position of the support pin 220 can be determined either by the mold itself or by part of an injection-molding machine used to inject molten plastic into the cavity and around the coil and preform assembly 160. However, the axial position of the coil and preform assembly is held in place by the mold clamping down upon a predetermined section of the coil and preform assembly 160, for example, by the mold clamping down on the a back portion of the rear ferrule 66. Hence, after the encapsulation process is completed the rear ferule extends out from the back end 56 of the encapsulation 30. The center conductor 248 is connected to the front ferrule 62 as delineated hereinabove. However, in this situation, and as shown in FIG. 17, solder 302 can be placed and melted directly onto the braided conductor 244 such that braided conductor 244 wicks the melted solder into contact with the bore or interior of the rear ferrule 66 and when cooled, permanently affixes the braided conductor 244 to the rear ferrule 66 thereby electrically and mechanically connecting the two together. The solder 260 and the solder 302 can be simultaneously or sequentially melted by, for example, inductive heating such that the center conductor and the braided conductor are affixed to the bores 64, 68 of the front and rear ferrules 62, 66, respectively Referring to FIG. 18, and in accordance with an alternative embodiment of the present invention, a preform 306 can be formed similar to preform 60, and further including a third ferrule 304 that is also placed on a ferrule support pin disposed within a mold shaped complementary to the desired form of the preform 306. Moldable material is then molded around the support pin, the front ferrule 62, the rear ferrule 66 and the third ferrule 304 such that the ferrules are inner-locked and linearly spaced apart along the long axis "A" thereby forming the preform 306 as shown in FIG. 18. Preferably, the third ferrule 304 is also formed of brass. Then, the coil can be tuned and coupled to the preform 306 in the same manner as delineated hereinabove with respect to preform 60 thereby defining a coil and preform assemble 320. This coil and preform assembly 320 can then be encapsulated as delineated hereinabove thereby defining an encapsulated probe tip 322. Specifically, the centering pin 220 can be used to provide the sole axial and radial support of the coil and preform assembly 320 or the axial position of the coil and preform assembly can held in place by the mold clamping down upon a predetermined section of the coil and preform assembly 320 by, for example, the mold clamping down on a back portion of the third ferrule 304. After the molding process is completed, a center conductor 308 and a braided coaxial conductor 310 of a triaxial cable 316 can be connected to the encapsulated probe tip 322 as delineated above and with reference to FIG. 12 while the braided triaxial conductor 314 can be connected to the rear ferrule by leaving a section of the braided triaxial conductor exposed at a location adjacent a back end of the third ferrule such that solder can be melted onto the braided triaxial conductor and allowed to wick into an area between the interior of the third ferrule and the braided triaxial conductor for electrically and mechanically locking the third ferrule to the braided triaxial conductor thereby forming a proximity probe 330 having a triaxial cable emanating from a back end of the encapsulated probe tip 322. As delineated hereinabove, a metal case can be similarly coupled to proximity probe 330.

Figure 19:
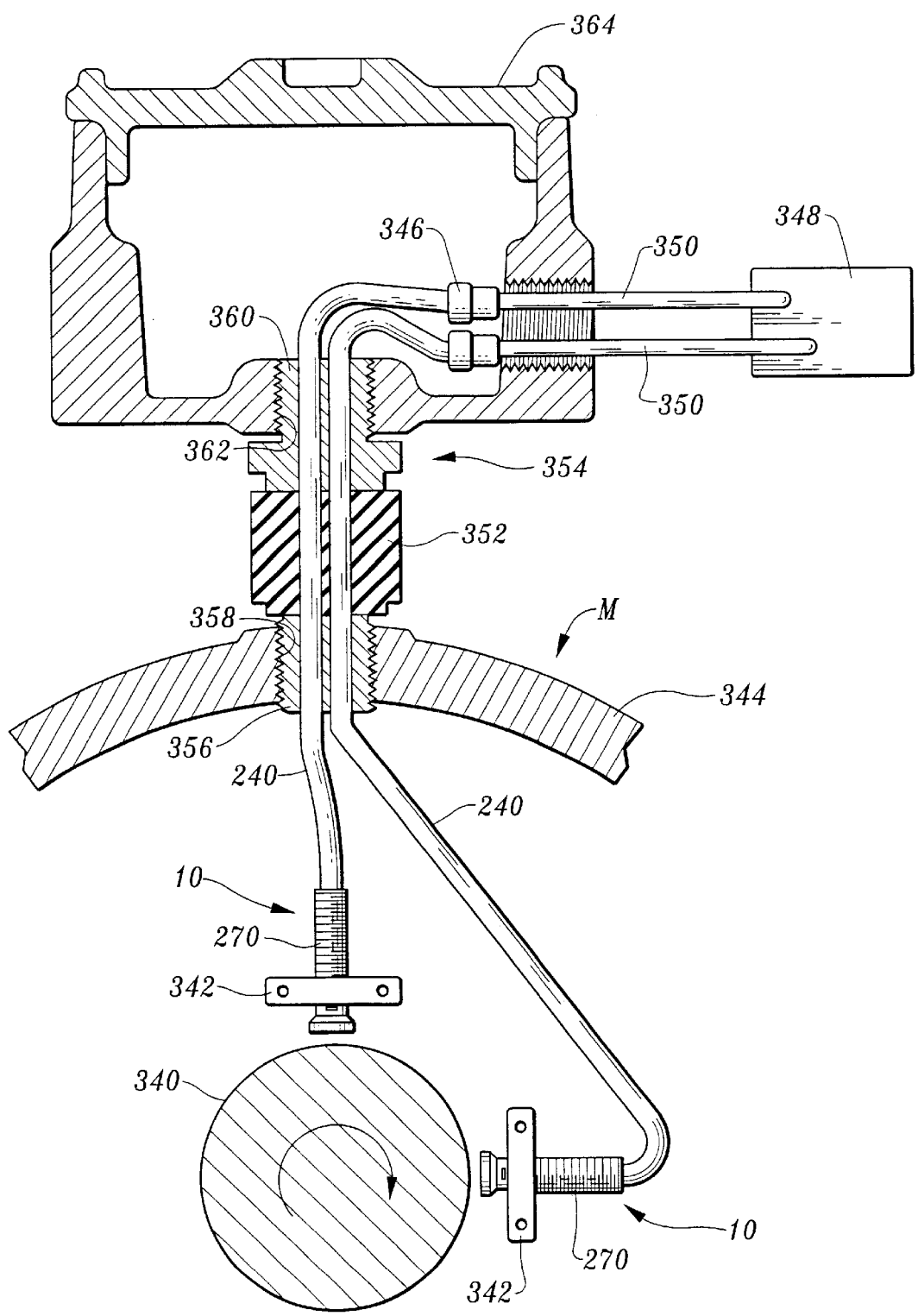
FIG. 19 is an elevational view of the encapsulated proximity probe pursuant to the present invention and shown juxtaposed to a rotating shaft of a machine for monitoring the vibration thereof.

In use and operation, and referring to FIG. 19, the proximity probe 10 and/or 330 may, for example, be utilized for monitoring the vibrational characteristics of a rotating shaft 340 of a machine M. In this environment the proximity probe 10 and/or 330 operate on the eddy current principle and output signals correlative to the spacing between the rotating shaft 340 and the coil 130 of the proximity probe 10 and/or 330.

For example, the encapsulated proximity probe tip 20 of the proximity probe 10 is circumscribed by the metal case 270 which is mounted adjacent the rotating shaft 340 of the machine M. A mounting means 342 is used to strategically mount the probe tip 20 such that the coil 130 and the rotating shaft 340 are in a juxtaposed relation. The coil 130 is electrically and mechanically connected to the cable 240. The cable 240 extends out the back end of the encapsulated proximity probe tip 20 and runs through a casing 344 of the machine M where it preferably terminates to a connection 346 capable of directly coupling to an electrical processing unit 348 or to an extension cable 350 that in turn couples to the electrically processing unit 348.

Preferably, the cable 240 is routed through the machine case 344 by passing through a rubber grommet 352 internal to an adaptor 354 operatively coupled to the machine case 344. The adaptor 354 includes a first end 356 having external threads. The external threads of the adaptor are coupled with a threaded bore 358 in the machine case 344 for firmly connecting the adaptor 354 thereto. In some instances, the internal threads of the first end 356 of the adaptor 354 allow the mounting of the probe tip via the threaded metal case 344. A second end 360 of the adaptor 354 includes external threads that may be coupled to a threaded aperture 362 in a junction box 364 such that the junction box 364 is mounted to the machine case 344. The junction box 364 allows any electrical connections operatively coupling the cable 240 to the electrical processing unit 348 to be enclosed in a weatherproof and/or explosion-proof environment.

Additionally, the proximity probe 10 may be employed very broadly in the monitoring and diagnostic field. One example of this is as a temperature transducer that would use a coil formed from a single wire thermocouple of the RTD type.

Moreover, having thus described the invention, it should be apparent that numerous structural modifications and adaptations may be resorted to without departing from the scope and fair meaning of the present invention as set forth hereinabove and as described hereinbelow by the claims.

I claim:

1. A method of making a proximity probe, the steps including:

providing a preform having an interior cavity accessible by an opened rearward end;

coupling a coil to the preform proximate a forward most end of the preform for defining a coil and preform assembly;

supporting the coil and preform assembly from within the interior cavity of the preform by axially locating a support pin through the rearward end such that the support pin extends within the interior cavity of the preform while having an end emanating from the opened rearward end of the preform;

cantilevering the end of the support pin between an upper and a lower mold plate for supporting the coil and preform assembly within a mold cavity defined by the upper and lower mold plates;

injecting moldable material into the mold cavity for molding an encapsulation of material over the coil and preform assembly wherein the encapsulated coil and preform assembly defines an encapsulated probe tip;

allowing the encapsulated probe tip to cure;

removing the encapsulated probe tip from the mold cavity;

removing the support pin from the coil and preform assembly, and coupling a cable to the encapsulated probe tip after the injecting step for forming a proximity probe.

2. The method of claim 1 further including the steps of:

providing a metal casing comprised of an elongated cylindrical structure having a sidewall defining a bore transitioning from a leading end to a trailing end of the structure, the sidewall including at least one geometrically shaped opening disposed through the sidewall and terminating in the bore;

sliding the metal casing over the cable and onto the encapsulated probe tip;

linearly positioning the metal casing to a location on the encapsulated probe tip, and interlocking the metal casing to the encapsulation of the encapsulated probe tip by applying heat to the metal casing for melting a portion of the underlying encapsulation and allowing the melted portion of the encapsulation to dispense into the geometrical opening disposed within the metal casing thereby interlocking the metal casing to the encapsulation at the linearly positioned location.

3. The method of claim 2 wherein the step of linearly positioning the metal casing includes linearly positioning the metal casing to a location on the encapsulated probe tip relative to the coil for trimming electrical characteristics of the coil.

4. The method of claim 1 wherein the step of providing the preform includes the step of molding the preform having at the forward most end an annular recess having a hollow interior circumscribing and defining an opening of a centering bore internally extending within the preform and having a longitudinal axis concentrically disposed with the longitudinal axis of the preform.

5. The method of claim 4 wherein the step of coupling the coil proximate the forward most end of the preform includes the steps of:

providing the sensing coil having a hollow interior;

locating the coil about the longitudinal axis of the preform by passing a mounting pin through the hollow interior of the coil and then passing the mounting pin through the hollow interior of the annular recess and into the centering bore such that the mating of the mounting pin with the centering bore centers the coil along the longitudinal axis of the preform and such that a back face of the coil having adhesive disposed thereon abuts an annular ledge of the annular recess for affixing the coil to the preform wherein the coil is coupled proximate the forward most end of the preform.

6. The method of claim 4 wherein the step of injecting moldable material into the mold cavity for molding an encapsulation of material over the coil and preform assembly includes the step of interlocking the encapsulation into the coil and preform assembly by integrally molding a front wall of moldable material over a front face of the coil and integrally molding an extension with the front wall that extends away from the front wall, ensconces and extends through a center void of the coil, and terminates in and ensconces the centering bore of the preform for interlocking the encapsulation into the coil and preform assembly.

7. The method of claim 1 further including the step of forming a through bore within the encapsulation at a location proximate an opened back end of the encapsulation during the injecting step, the through bore passing through a sidewall of the encapsulation and terminating in open communication with the rearward cavity of the preform.

8. The method of claim 7 further including the step of inserting an end of a cable through the opened back end of the encapsulation, through the opened rearward end of the preform, and into the rearward cavity of the preform, the end of the cable having a portion braided conductor exposed and in open communication with the through bore.

9. The method of claim 8 further including the steps of inserting solder within the through bore, melting the solder, allowing the solder to flow along the braided conductor and into contact with an interior of a ferrule molded within said preform and circumscribing the braided conductor for electrically and mechanically connecting the braided conduct to the coil and preform assembly.

10. The method of claim 1 wherein the step of supporting the coil and preform assembly from within the interior cavity of the preform includes providing the support pin comprised of a base integrally formed with an elongated cylindrical body that is axially located through the rearward end and within the interior cavity of the preform while having base outside of the preform.

11. The method of claim 10 wherein the step of cantilevering the end of the support pin between the upper and lower mold plates for supporting the coil and preform assembly within the mold cavity defined by the upper and lower mold plates includes cantilevering the base of the support pin between the upper and lower mold plates for supporting the coil and preform assembly on the elongated cylindrical body of the support pin and within the mold cavity.

12. A method of making a proximity probe, the steps including:

providing a preform having an interior cavity accessible by an opened rearward end;

coupling a coil to the preform proximate a forward most end of the preform for defining a coil and preform assembly;

locating a single support pin through the rearward end such that the single support pin extends within the interior cavity of the preform while having an end emanating from the opened rearward end of the perform;

cantilevering the end of the single support pin emanating from the opened rearward end of the preform between an upper and a lower mold plate defining a mold cavity for supporting the coil and preform assembly from the rear ward end with only the single support pin received within the interior cavity of the preform assembly and cantilevered between the upper and the lower mold plate defining the mold cavity;

injecting moldable material into the mold cavity for molding an encapsulation of material over the coil and preform assembly wherein the encapsulated coil and preform assembly defines an encapsulated probe tip, allowing the encapsulated probe tip to cure;

removing the encapsulated probe tip from the mold cavity;

removing the support pin from the coil and preform assembly, and coupling a cable to the encapsulated probe tip after the injecting step for forming a proximity probe.

13. The method of claim 12 further including the step of forming a through bore with the encapsulation at a location proximate the opened back end of the encapsulation for providing open communication between an exterior of the encapsulation and the interior cavity.

14. The method of claim 13 wherein the step of coupling the cable to the encapsulated probe tip includes the steps of inserting an end of the cable through the opened rearward end of the preform and into the interior cavity such that a portion of an exposed braided conductor of the cable is in open communication with the through bore.

15. The method of claim 14 further including the steps of inserting solder within the through bore, melting the solder, allowing the solder to flow along the braided conductor and into contact with an interior of a ferrule molded within the preform and circumscribing the braided conductor for electrically and mechanically connecting the braided conductor to the coil and preform assembly.

16. The method of claim 12 wherein the step of providing the perform having the interior cavity accessible by the opened rearward end further includes the step of forming the preform having the forward most end comprised of a hollow annular recess having a hollow interior circumscribing and defining an opening of a centering bore internally disposed within the preform such that a longitudinal axis of the centering bore is substantially concentric with a longitudinal axis of the preform.

17. The method of claim 16 wherein the step of coupling the coil to the preform proximate the forward most end of the preform for defining the coil and preform assembly includes providing the coil having a center void defined by a hollow interior and formed from turns of wire and locating the coil about a longitudinal axis of the preform by passing a mounting pin through the hollow interior of the coil and then passing the mounting pin through the hollow interior of the hollow annular recess and into the centering bore such that the mating of the mounting pin with the centering bore substantially centers the coil along the longitudinal axis of the preform and such that a back face of the coil having adhesive disposed thereon abuts an annular ledge of the hollow annular recess for affixing the coil to the preform for defining the coil and preform assembly.

18. The method of claim 17 further including the step of tuning the coil by pulling turns of wire from a center of the coil accessible by way of the hollow annular recess and the hollow interior of the coil.

19. A method of making a proximity probe, the steps including:

providing a preform having an interior cavity accessible by an opened rearward end;

coupling a coil to the preform proximate a forward most end of the preform for defining a coil and preform assembly;

locating a single support pin through the rearward end such that the single support pin extends within the interior cavity of the preform while having an end emanating from the opened rearward end of the perform;

cantilevering the end of the single support pin emanating from the opened rearward end of the preform between an upper and a lower mold plate defining a mold cavity for supporting the coil and preform assembly from the rear ward end with only the single support pin received within the interior cavity of the preform assembly and cantilevered between the upper and the lower mold plate defining the mold cavity;

injecting moldable material into the mold cavity for molding an encapsulation of material over the coil and preform assembly wherein the encapsulated coil and preform assembly defines an encapsulated probe tip;

forming a through bore with the encapsulation at a location proximate the opened back end of the encapsulation for providing open communication between an exterior of the encapsulation and the interior cavity;

allowing the encapsulated probe tip to cure;

removing the encapsulated probe tip from the mold cavity;

removing the support pin from the coil and preform assembly, and coupling a cable to the encapsulated probe tip after the injecting step for forming a proximity probe.

* * * * *